Patented June 24, 1947

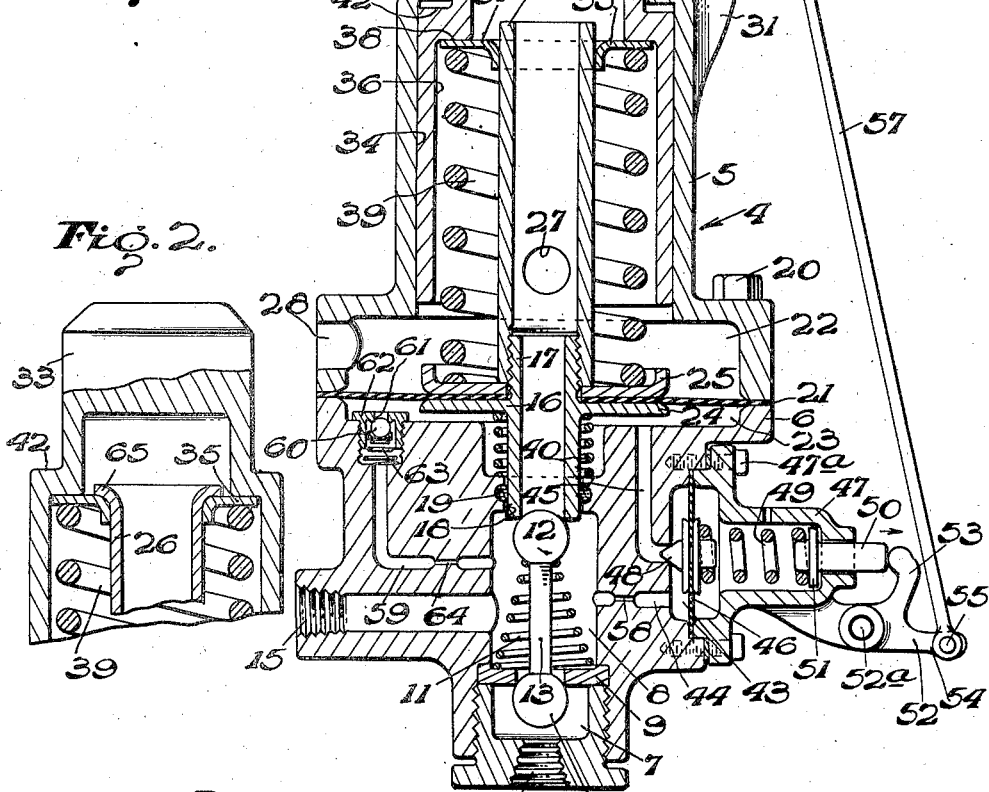

2,423,012

UNITED STATES PATENT OFFICE 2,423,012

FLUID PRESSURE CONTROL MECHANISM

Wilfred A. Eaton, Elyria, Ohio, assignor to Bendix-Westinghouse Automotive Air Brake Company, Elyria, Ohio, a corporation of Delaware Application May 18, 1945, Serial No. 594,513

15 Claims. (Cl. 303—54)

This invention relates to fluid pressure control mechanism, and more particularly to self-lapping control valve mechanism of the type utilized for controlling the supply of fluid pressure to the brake actuators of a vehicle.

It has previously been proposed to utilize valves of the self-lapping type to control the supply of fluid pressure to the brake actuators of the vehicle, these valves being so constructed that the valve operating element may be moved in one direction to open the inlet valve through a resilient connection between an operator controlled member and the valve operating element, and moved in the other direction by means of a pressure responsive member responsive to the pressure supplied by the control valve mechanism to the brake actuators. Although valves of this type have been very satisfactory in operation, the rate at which fluid pressure has been supplied to the actuators by these valves has been unnecessarily slow in some cases, due to the fact that the action of the fluid pressure supplied to the actuators on the pressure responsive member of the valve mechanism has tended to gradually close the inlet valve during the application of fluid pressure to the brake actuators, thus restricting the flow of fluid pressure thereto, and it is accordingly one of the objects of the present invention to provide means for overcoming this difficulty.

Another object of the present invention is to provide, in connection with valve mechanism of the above type, means for preventing the pressure responsive member of the valve mechanism from being subjected to the output pressure of the valve until that pressure reaches a value substantially equal to that for which the valve mechanism has been adjusted by the operator.

A further object of the invention is to provide, in valve mechanism of the above type, means synchronized with the operator controlled element and controlled thereby, for controlling the flow of fluid pressure to the pressure responsive member of the valve mechanism during operation thereof.

Still another object of the invention is to provide, in connection with the valve mechanism of the above described type, means for insuring the release of fluid pressure from the pressure responsive member of the valve mechanism when the latter is operated to release fluid pressure from the brake actuators.

It is often desirable to interpose a preloaded resilient member between the operator-controlled member and the valve operating element, and it is another object of the invention to provide means for controlling the supply of fluid pressure to the pressure responsive member of the valve mechanism so constituted as to synchronize with the operation of the operation of the balance of the valve mechanism.

Another object of the invention is to provide, in connection with a self-lapping valve mechanism having a valve for controlling the supply of fluid pressure thereby and adjustable by the operator to establish and maintain a selected pressure, means for insuring maintenance of the valve in wide open position until the pressure delivered by the valve mechanism substantially equals the selected pressure.

Still another object of the invention is to provide simple and efficient means for modifying the lapping action of a self-lapping valve mechanism and to decrease the time required to supply fluid at a selected pressure by the valve mechanism.

Although a preferred embodiment of the invention and a modified form thereof have been illustrated in the accompanying drawing, it is to be expressly understood that the drawing is employed for the purpose of illustration only, and is not designed as a definition of the limits of the present invention, reference being had for this purpose to the appended claims.

In the drawing, where similar reference characters refer to similar parts throughout the several views:

Fig. 1 is a partial sectional view of a control valve mechanism constructed in accordance with the principles of the present invention;

Fig. 2 is a partial sectional view of a portion of the valve mechanism showing a modification of the valve operating mechanism, and Fig. 3 is a sectional view of another portion of the valve mechanism adapted to cooperate with the modified mechanism shown in Fig. 2.

Referring more particularly to Fig. 1, the invention is disclosed as including a casing 4 formed of upper and lower casing members 5 and 6 respectively. The casing may be supported on the vehicle in any suitable manner, not shown, and the lower portion 6 of the casing is provided with inlet and outlet chambers 7 and 8 separated by means of a ported partition 9. Communication between chambers 7 and 8 is normally prevented by means of an inlet valve 10 maintained in the position shown by means of an inlet valve spring 11 interposed between the upper surface of the partition and the lower surface of an exhaust valve 12 connected with the inlet valve by means of a stem 13. The inlet chamber is provided with an inlet port 14 adapted to be connected to a suitable fluid pressure supply reservoir, not shown, and the outlet chamber 8 is provided with an outlet port 15 adapted to be connected to a brake actuator or other actuator, likewise not shown. A valve operating element 16, provided with a central bore 17, is slidably mounted in a bore 18 formed in the housing, the lower end of the bore being adapted to normally engage the upper surface of the exhaust valve 12, as will be more fully described hereinafter, a seal 19 being mounted in the bore 18 in engagement with the outer surfaace of the valve operating element 16 in order to prevent the escape of fluid pressure from the outlet chamber at this point. The casing members 5 and 6 are clamped together by means of suitable cap screws 20, and a diaphragm 21, clamped between the casing members serves to define in connection therewith, an exhaust chamber 22 and a control chamber 23. The diaphragm is clamped at its center to the valve operating element 16 between a flanged portion 24 formed on the element and a washer 25 maintained in position against the upper side of the diaphragm by means of a tubular guide member 26 threadedly received by the upper end of the valve operating element, ports 27 formed in the tubular guide member serving to connect the bore 17 with the exhaust chamber 22, the latter in turn being connected with atmosphere by means of an exhaust port 28.

An operator's control pedal or lever 29 is pivotally mounted by means of a pivot pin 30 on a bracket 31 formed on the casing member 5, a projection 32 formed on the lower surface of the lever at the left of the pivot pin 30 being adapted to engage a valve operating plunger 33 slidably mounted in a bore 34 formed in the casing member 5. A guide washer 35 is slidably mounted on the outside of the tubular member 26, the outer periphery of the washer being guided in a bore 36 formed in the plunger 33, and the upper surface 37 of the washer being in engagement with a shoulder 38 formed on the member 33 at the upper end of the bore 36. A graduating spring 39 is interposed between the lower surface of the washer 35 and the upper surface of the washer 25, and it will thus be apparent that on counterclockwise movement of the lever 29, the plunger 33 will be moved downward to compress the graduating spring 39, and to thus impart a downward force to the valve operating element 16 which will move the inlet valve 10 to open position against the action of the inlet valve spring 11, thus admitting fluid pressure from the inlet chamber 7 to the outlet chamber 8.

For convenience of explanation in the present instance, the valve mechanism has been shown with the inlet and exhaust valves both in closed position, and it will be understood that for the purposes of this explanation, the downward force exerted by the weight of the control lever 29 on the plunger 33 is substantially balanced by means of a spring 40 interposed between the flange 24 of the valve operating element and the casing in order to maintain the parts in the position shown. A shoulder 41 formed at the upper end of the bore 34 is so positioned with respect to a similar shoulder 42 formed on the plunger 33, as to permit further upward movement of the assembly comprising the valve operating element, graduating spring and plunger in order to permit opening of the exhaust valve 12 during certain additions of operation. It will also be understood by those skilled in the art that if desired, the valve mechanism may be so constructed with the control lever in released position, the inlet valve is normally closed and the exhaust valve is normally open in order to permit free communication between the outlet chamber 8 and atmosphere through the bore 17, the tubular member 26, the ports 27 and exhaust chamber 22.

As heretofore stated, the pressure responsive member or diaphragm 21 in valve mechanisms of this type is normally subjected at all times to the pressure in the outlet chamber through a suitable passage, the result being that when the control lever 29 is moved through a predetermined angle in a counterclockwise direction, the pressure supplied to the outlet chamber by the opening of the inlet valve acts on the lower surface of the diaphragm to oppose the downward force exerted by the graduating spring, and eventually overcomes that force and moves the valve operating element upward to the position shown in the drawing, so that the inlet and exhaust valves are both closed and the valve mechanism is lapped. The pressure maintained in the outlet chamber when this occurs is proportional to the degree of compression of the graduating spring when the diaphragm is moved back to the neutral position shown, and therefore proportional to the degree of movement of the plunger 33 and the degree of force exerted on the plunger by the lever when the valves are in the position shown, although it will be understood that during initial operation of the control lever to open the inlet valve, the graduating spring is not fully compressed until lapping of the valve mechanism occurs, due to the fact that downward movement of the valve operating element is initially opposed only by the force exerted on the exhaust valve by the inlet valve spring 11 and the fluid pressure force in the inlet chamber 7 acting on the effective area of the inlet valve 10. Thus, on initial downward movement of the plunger 33 by operation of the lever 29, the inlet valve 10 is moved to fully open position, and in order to prevent movement of the inlet valve toward closed position due to the increase in pressure in the outlet chamber 8 acting upwardly on the diaphragm 21 to compress the graduating spring until the pressure in the outlet chamber is substantially proportional to the degree of movement of the plunger 33, means controlled by the operation of the lever 29 are provided for the purpose of preventing fluid pressure from being supplied to the control chamber 23 from the outlet chamber 8 until the pressure in the latter chamber is substantially sufficient to move the valve operating element back to neutral position shown against the force exerted by the graduating spring due to movement of the lever 29 through a predetermined angle in order to adjust the valve mechanism to deliver an output pressure proportional to the degree of movement of the lever.

In order to accomplish the above described type of operation, a cavity 43 is provided in the casing member 6 as shown, this cavity being connected with the outlet chamber 8 by means of a passage 44, and with the control chamber 23 by means of a passage 45. A pressure responsive member or flexible diaphragm 46 is clamped to the casing 6 by means of a cover member 47 and cap screws 47a, the diaphragm thus being subjected to the pressure in the cavity 43 at all times. A valve 48 is suitably clamped at the center of the diaphragm and is adapted to close the right end of the passage 45 in order to prevent the flow of fluid pressure from the cavity 43 to the control chamber 23. A suitable graduating spring 49 adapted to bias the valves toward closed position is interposed between the right side of the diaphragm and the left end of an operating plunger 50 slidably mounted in the cover 47, movement of the plunger to the right in the cover being preferably limited by means of a flanged portion 51. With the parts in the position shown, the mechanism is preferably so constructed that the graduating spring 49 is not compressed, the valve 48 resting against the end of the passage 45 without appreciable force. The structure just described thus provides means for regulating the flow of pressure from the outlet chamber to the control chamber, and since the diaphragm 46 is subjected at all times to the pressure in the outlet chamber, it will be apparent that the pressure at which the diaphragm will move the valve 48 to the right to establish communication between the chamber 43 and the chamber 23 through the passage 45, will be dependent on the degree of compression on the graduating spring 49. The compression of the latter spring is varied in accordance with the movement of the control lever 29 by means of a bellcrank lever 52 pivotally mounted on the cover 47 by means of a pivot pin 52a, said lever having a lever arm 53 adapted to abut the right end of the plunger 50 and a lever arm 54 connected with the lever 29 at the right of the pivot pin 30 by means of pivot pins 55 and 56 and connecting link 57. In the embodiment of the invention shown, the angularity of the lever arms of the lever 29 acting on the plunger 33 and the link 57, and the angularity of the lever arms 53 and 54 are so chosen that the degree of movement of the plunger 50 is at all times substantially proportional to the degree of movement of the valve operating plunger 33, the result being that with the diaphragm 21 and the valve operating element 16 in neutral position due to lapping of the valve, the degree of compression of the graduating spring 39 is at all times substantially proportional to the degree of compression of the graduating spring 49. Thus, a given degree of downward movement of the plunger 33 will set the valve mechanism to supply a corresponding pressure to the outlet chamber and result in a predetermined degree of compression of the graduating spring when the valve operating element and diaphragm return to the position shown, and the area of the diaphragm 46, the dimensions of the graduating spring 49, and the dimensions of the above described lever arms are preferably so chosen that the pressure in the chamber 43 required to move the valve 48 to open position for any predetermined position of the control lever 29 will be substantially the same as the pressure required in the chamber 23 to move the diaphragm back to the neutral position shown after the valve mechanism has been operated to move the inlet valve to open position in order to supply fluid pressure to the outlet chamber and to the actuator connected thereto at a selected pressure determined by the degree of movement of the lever 29.

Thus, assuming that the pedal 29 is moved downward sufficiently to adjust the graduating spring 39 to establish and maintain a pressure of 20 pounds in the outlet chamber 8, it will be readily seen that on movement of the control lever 29 to set the graduating spring 39 to deliver this pressure, the graduating spring 49 will be proportionally compressed by the action of the bellcrank lever 52, and a pressure of substantially 20 pounds in the chamber 43 will be required in order to move the valve 48 to open position. When this pressure is reached in the outlet chamber and in the cavity 43, such opening of the valve 48 will occur, and a pressure of 20 pounds will be supplied to the control chamber 23 whereupon the diaphragm 21 will move the valve operating element 16 upward to the position shown, and the graduating spring 39 will be compressed to the value necessary to establish and maintain the 20 pound pressure in the outlet chamber. The inlet valve will thus remain in wide open position until the pressure in the outlet chamber reaches a value of substantially 20 pounds. In the event a further increase of pressure in the outlet chamber is desired, the lever 29 is moved further in a counterclockwise direction, with a resultant immediate further compression of the graduating spring 49 to again close the valve 48 to prevent communication between chambers 23 and 8, and to maintain the previous 20 pound pressure in the chamber 23, as well as further compression of spring 39 to again open inlet valve 10. Here again, the new pressure required to again open the valve 48 will be dependent on the additional downward movement of the valve operating plunger 33, and the valve 48 will again remain closed until the pressure in the outlet chamber reaches a value corresponding substantially to the new position of the operator's control lever 29. When this occurs, the valve 48 will again open, and the valve element 16 will be moved rapidly upward to permit closing of the inlet valve 10 under the action of the inlet valve spring 11. When the valve 48 is moved to open position, it is sometimes desirable to limit the rate of flow of fluid pressure from the outlet chamber to the control chamber 23 through the passage 44, the chamber 43 and the passage 45, in order to limit the rate of pressure change in chamber 23, and to this end a restricted portion or choke 58 is provided in the passage 44 as shown, the area of the choke being proportioned in accordance with the volume of the chamber 23. By thus limiting the rate of flow of fluid pressure into the chamber 23, rapid upward movement of the diaphragm and valve operating element, which might tend to open the exhaust valve and exhaust fluid pressure to atmosphere, may be prevented.

If it is desired to reduce the pressure in the outlet chamber 8, the lever 29 is allowed to move in a clockwise direction, whereupon the force exerted by the graduating spring 39 is decreased and the valve operating element is moved upward by the diaphragm 21 to open the exhaust valve and release fluid pressure from the outlet chamber to atmosphere. During this type of operation, it is necessary to insure the release of fluid pressure from the control chamber 23 into the outlet chamber 8, and thence to atmosphere through the bore 17, the tubular member 26, the ports 27, exhaust chamber 22 and exhaust port 28, and such a release is effected by means of a return passage 59 serving to connect the control chamber with the outlet chamber, together with a one-way check valve 60 seated at the lower end of a bore 61 formed in a check valve housing 62 by means of a valve spring 63 interposed between the lower surface of the check valve and the casing member 6. The spring 63 is of relatively light construction, and allows the check valve 60 to open whenever the pressure in the outlet chamber drops to a value slightly below that obtaining in the control chamber 23. At the same time, the check valve prevents the flow of fluid pressure through the passage 59 to the control chamber, and therefore insures control of the flow of fluid pressure from the outlet chamber to the control chamber by means of the valve 48, as heretofore described. Although the valve mechanism has been illustrated with the inlet and exhaust valves in closed position, it is obvious that by increasing the tension of the spring 40 sufficiently to overcome the weight of the pedal 29, the valve operating element will be moved upward to open the exhaust valve, and the graduating spring and the plunger 33 will likewise be moved upward until the shoulder 42 on the plunger 33 engages the shoulder 41 on the casing member 5. In this event, the bellcrank lever 52 will be correspondingly moved in a clockwise direction to allow clearance between the lever arm 53 and the right end of the plunger 50, without in any way affecting the proportional increase in the degree of compression in the two graduating springs with the valve mechanism in lapped position.

Although, as heretofore stated, the mechanism is so proportioned that the pressure necessary to open the valve 48 is at all times substantially the same as that necessary in the chamber 23 to move the valve operating element upward to neutral or lapped position against the force exerted by the graduating spring 39, it will also be understood that the graduating springs, diaphragms, and the operating leverage for the plunger 50, can be so proportioned that while the rate of increase in the degree of compression in the two graduating springs is proportional with the valve mechanism in lapped position, the increase in compression of the spring 49 lags behind that of the spring 39, in such a manner that the pressure required to open the valve 48 is at all times slightly less than that required to move the valve operating element upward to the neutral position shown in order to maintain the latter pressure in the outlet chamber. This may be accomplished by so arranging the lever arm 53 of the bellcrank 52 that compression of the graduating spring 49 is not initiated until after downward movement of the valve operating plunger 33 occurs in response to the movement of the control pedal 29. In the event the mechanism is constructed as just described, the intake valve will remain in wide open position until the pressure in the outlet chamber is slightly less than that for which the control pedal 29 has been set, and when this pressure is reached, the valve 48 will be moved to open position and will remain in open position until the force exerted on the graduating spring 49 has again been changed by movement of the pedal 29. Thus the lapping action of the valve mechanism to bring both of the valves to closed position will be initiated before the maximum output pressure of the valve is reached in the outlet chamber, and any tendency for the valve operating element to open the exhaust valve when the valve 48 is opened may be eliminated. It is also desirable in some cases to limit the rate of flow of fluid pressure from the control chamber 23 to the outlet chamber through the passage 59 in order to maintain the exhaust valve in open position for a lower period of time during release action of the valve mechanism, and to this end, a restricted portion or choke 64 may be provided in the passage 59 to control the flow of fluid therethrough.

As more fully illustrated and described in the patent to Andres and Sanford, No. 2,133,275 dated October 18, 1938, it is sometimes desirable to precompress or preload the graduating spring 39, and such a construction is indicated in Fig. 2 of the drawing. In this modification, the upper end of the tubular member 26 is provided with a flanged portion 65 adapted to engage the upper surface of the guide washer 35, the result being that graduating spring 39 may be initially precompressed between the guide washer 35 and the washer 25, for reasons more fully explained in the above referred to patent. In this event, and in order to insure that the compression of the graduating spring 49 will be proportional to that of the spring 39 when the valve operating element is in neutral position, it is desirable to similarly preload the graduating spring 49 between the right side of the diaphragm 46 and the left end of the valve operating plunger. To this end, a stem 66 is provided on the valve 48 and a washer 67 is slidably mounted thereon and adapted to engage the right end of the spring 49. The right end of the valve stem is adapted to threadedly receive a nut 68 which provides for preloading of the graduating spring 49 in proportion to the degree of preloading of the spring 39. The ratio of preloading of the springs being preferably the same as the ratio of the areas of the pressure responsive members associated therewith. A bore or recess 69 is provided in the left end of the plunger 50 in order to provide clearance for the valve stem 66 and the nut 68 when the plunger is moved to the left to compress the graduating spring. Here again the various parts are so proportioned that the degree of compression of the graduating spring 49 is at all times proportional to the degree of compression of the main graduating spring 39 when the valve operating element 16 is in the neutral position shown, thus insuring against opening of the valve 48 until the pressure in the outlet chamber is equal to or slightly less than that for which the control pedal 29 is set by the operation.

The present invention thus provides means for insuring, in valve mechanism of the self-lapping type, movement to and maintenance of the inlet valve in wide open position until the pressure in the outlet chamber reaches substantially the value selected by the operator, whereupon fluid pressure is admitted to the control chamber under the pressure responsive member 21 in order to allow the latter to move the valve operating element to lapped position against the force exerted by the graduating spring on the valve operating element to move the latter downward. The gradual closing of the inlet valve during operation of the valve mechanism to supply fluid at a selected pressure to the outlet chamber, which is normally inherent to this general type of self-lapping valve, is substantially eliminated, and the rate at which the pressure is increased in the outlet chamber, and in any actuator connected thereto, is materially increased, this increase being of particular importance in connection with the operation of vehicle brakes. At the same time, proper operation of the valve mechanism during release is insured by the operation of the check valve 60, and in the event the use of a preloaded main graduating spring is desired, means have been provided for coordinating the action of the graduating spring 49 with that of the preloaded main graduating spring by proportionally preloading the spring 49.

While the invention has been illustrated and described herein with considerable particularity, it is to be understood that the same is not limited to the forms shown, but may receive a variety of mechanical expressions as will readily appear to those skilled in the art. Reference will, therefore, be had to the appended claims for a definition of the limits of the invention.

What is claimed is:

1. Self-lapping fluid pressure control valve mechanism including a casing having inlet and outlet chambers, a valve for controlling the flow of fluid between said chambers, a valve operating element, operating means for moving said element in one direction to open the valve, means for moving the element in the opposite direction and for controlling the operation of the element for establishing and maintaining a pressure of fluid in the outlet chamber substantially proportional to the degree of force exerted on said element by said operating means including a pressure responsive member connected with the element and adapted to be subjected to the pressure of fluid in the outlet chamber, means for subjecting the pressure responsive member to the pressure in the outlet chamber including a fluid passage connected with the outlet chamber and means including a valve controlled by the pressure of fluid in the outlet chamber for preventing the flow of fluid through said passage and the application of said fluid to said pressure responsive member until the pressure in said outlet chamber substantially reaches said proportional pressure.

2. Self-lapping fluid pressure control valve mechanism including a casing having inlet and outlet chambers, a valve for controlling the flow of fluid between said chambers, a valve operating element, operating means for moving said element in one direction to open the valve, means for moving the element in the opposite direction and for controlling the operation of the element for establishing and maintaining a pressure of fluid in the outlet chamber substantially proportional to the degree of force exerted on said element by said operating means including a pressure responsive member connected with the element and adapted to be subjected to the pressure of fluid in the outlet chamber, means for subjecting the pressure responsive member to the pressure in the outlet chamber including a fluid passage connected with the outlet chamber, and means including a valve controlled by the pressure of fluid in the outlet chamber and by the operating means for preventing the flow of fluid through said passage and the application of said fluid to the pressure responsive member until the pressure in said outlet chamber substantially reaches said proportional pressure.

3. Self-lapping fluid pressure control valve mechanism including a casing having inlet and outlet chambers, a valve for controlling the flow of fluid between said chambers, a valve operating element, and means for controlling the operation of said element including operating means for moving the element in one direction, a pressure responsive member adapted to be subjected to the pressure of fluid in the outlet chamber for moving the element in the other direction, and means including a valve controlled by the pressure in the outlet chamber and by said operating means for controlling the subjection of the pressure responsive member to the pressure of fluid in the outlet chamber.

4. Self-lapping fluid pressure control valve mechanism including a casing having inlet and outlet chambers, an inlet valve for controlling the flow of fluid between said chambers, an exhaust port, an exhaust valve for controlling the flow of fluid between said outlet chamber and exhaust port, an element for operating said valves, operating means for moving the element in one direction to open the inlet valve, a pressure responsive member for moving the element in the other direction to permit closing of the inlet valve and to open the exhaust valve, means for subjecting said pressure responsive member to the pressure in said outlet chamber including a fluid passage connected with the outlet chamber, and means for controlling the flow of fluid in said passage including a valve controlled by the pressure in said outlet chamber and by said operating means.

5. Self-lapping fluid pressure control valve mechanism including a casing having inlet and outlet chambers, an inlet valve for controlling the flow of fluid between said chambers, an exhaust port, an exhaust valve for controlling the flow of fluid between said outlet chamber and exhaust port, an element for operating said valves, operating means for moving the element in one direction to open the inlet valve, a pressure responsive member for moving the element in the other direction to permit closing of the inlet valve and to open the exhaust valve, means for subjecting said pressure responsive member to the pressure in the outlet chamber including a pair of fluid passages connected with the outlet chamber, means for controlling the flow of fluid through one of said passages including a valve controlled by the pressure in the outlet chamber and by said operating means, and a valve associated with said other passage for preventing the flow of fluid therethrough in one direction and for permitting the flow of fluid therethrough in the opposite direction.

6. Self-lapping fluid pressure control valve mechanism including a casing having inlet and outlet chambers, an inlet valve for controlling the flow of fluid pressure between said chambers, an exhaust port, an exhaust valve for controlling the flow of fluid between said outlet chamber and exhaust port, an element for operating said valves, and means for controlling the operation of said element including operator-controlled means having a resilient connection with the element, a control chamber formed in the casing having a pressure responsive member movably mounted therein and operatively connected with said element, a fluid passage connecting said outlet chamber and control chamber, and valve means controlled by the pressure in said outlet chamber and by the operator-controlled means for controlling the flow of fluid through said passage.

7. Self-lapping fluid pressure control valve mechanism including a casing having inlet and outlet chambers, an inlet valve for controlling the flow of fluid pressure between said chambers, an exhaust port, an exhaust valve for controlling the flow of fluid between said outlet chamber and exhaust port, an element for operating said valves, and means for controlling the operation of said element including operator-controlled means having a resilient connection with the element, a control chamber formed in the casing having a pressure responsive member movably mounted therein and connected with the elements, a fluid passage between said outlet chamber and control chamber, a control valve for controlling the flow of fluid through said passage, and means for controlling the operation of said control valve including a second pressure responsive member connected with the valve and responsive at all times to the pressure of fluid in the outlet chamber, and a resilient operative connection between said valve and said operator-controlled means.

8. Self-lapping fluid pressure control valve mechanism including a casing having inlet and outlet chambers, an inlet valve for controlling the flow of fluid pressure between said chambers, an exhaust port, an exhaust valve for controlling the flow of fluid between said outlet chamber and exhaust port, an element for operating said valves, and means for controlling the operation of said element including operator-controlled means having a resilient connection with the element, a control chamber formed in the casing having a pressure responsive member movably mounted therein and connected with the element, a pair of fluid passages for connecting the outlet chamber with the control chamber, a check valve associated with one of said passages for permitting the flow of fluid therethrough in one direction and for preventing the flow of fluid therethrough in the other direction, a control valve for controlling the flow of fluid through the other of said passages, and means for controlling the operation of said control valve including a member responsive to the pressure of fluid in the outlet chamber and a resilient operating connection between said control valve and operator-controlled means.

9. Self-lapping fluid pressure control valve mechanism including a casing having inlet and outlet chambers, an inlet valve for controlling the flow of fluid pressure between said chambers, an exhaust port, an exhaust valve for controlling the flow of fluid between said outlet chamber and exhaust port, an element for operating said valves, and means for controlling the operation of said element including a movable operator-controlled member having a resilient connection with the element, a control chamber formed in the casing having a pressure responsive member movably mounted therein and operatively connected with said element, a fluid passage connecting said outlet chamber and control chamber, a control valve for controlling the flow of fluid through said passage, and means for controlling the operation of said valve including a member responsive to the pressure of fluid in the outlet chamber for moving said control valve in one direction, a spring for biasing the control valve in the other direction, and means for stressing said spring with a force substantially proportional to the degree of movement of said operator-controlled member including an operative connection between said spring and last named member.

10. Self-lapping fluid pressure control valve mechanism including a casing having inlet and outlet chambers, an inlet valve for controlling the flow of fluid pressure between said chambers, an exhaust port, an exhaust valve for controlling the flow of fluid between said outlet chamber and exhaust port, an element for operating said valves, and means for controlling the operation of said element including a movable operator-controlled member and a graduating spring interposed between said operator-controlled member and element, a control chamber formed in the casing having a pressure responsive member movably mounted therein and operatively connected with said element, a pair of fluid passages connecting said outlet chamber with said control chamber, a check valve associated with one of said passages for permitting the flow of fluid from the control chamber to the outlet chamber and for preventing the flow of fluid in the opposite direction, a control valve for controlling the flow of fluid through the other of said passages, and means for controlling the operation of said control valve including a member responsive to the pressure in the outlet chamber for moving the control valve to open position, a spring for biasing said control valve toward closed position, and means for stressing said spring with a force substantially proportional to the degree of movement of said operator-controlled member including an operative connection between said biasing spring and said last named member.

11. The combination with a self-lapping valve mechanism of the type including an outlet chamber, a valve for controlling the supply of fluid pressure to said outlet chamber, an element for operating the valve, an operator-controlled member, and means for controlling the operation of said element to operate the valve to establish and maintain a selected pressure in said outlet chamber substantially proportional to the degree of movement of said operator-controlled member including a resilient connection between the operator-controlled member and the element for moving the latter in one direction to open the valve and a member responsive to the pressure in the outlet chamber for moving the element in the opposite direction to permit closing of the valve, of means for preventing movement of said element in said opposite direction to permit closing of the valve until the pressure in the outlet chamber substantially equals said selected pressure, said last named means including means for conducting fluid from said outlet chamber to said pressure responsive member, a control valve for controlling the flow of fluid through said conducting means, a pressure responsive member for moving said control valve to open position, a spring for biasing said control valve toward closed position, and a connection between said operator-controlled means and biasing spring for stressing the latter substantially in proportion to the degree of movement of said operator-controlled member, whereby the last named pressure responsive member is ineffective to move the control valve to open position until the pressure of fluid in the outlet chamber substantially equals said selected pressure.

12. The combination with a self-lapping valve mechanism of the type including an outlet chamber, a valve for controlling the supply of fluid pressure to said outlet chamber, an element for operating the valve, an operator-controlled member, and means for controlling the operation of said element to operate the valve to establish and maintain a selected pressure in said outlet chamber substantially proportional to the degree of movement of said operator-controlled member including a preloaded resilient connection between the operator-controlled member and element for moving the latter in one direction to open the valve and a member responsive to the pressure in the outlet chamber for moving the element in the opposite direction to permit closing of the valve, of means for preventing movement of said element in said opposite direction to permit closing of the valve until the pressure in the outlet chamber substantially equals said selected pressure, said last named means including means for conducting fluid from said outlet chamber to said pressure responsive member, a control valve for controlling the flow of fluid through said conducting means, a second pressure responsive member for moving said control valve to open position, a spring for biasing said control valve toward closed position, a connection between said operator-controlled means and biasing spring for stressing the latter substantially in proportion to the degree of movement of the operator-controlled member, whereby the last named pressure responsive member is ineffective to move the control valve to open position until the pressure in the outlet chamber substantially equals said selected pressure, and means for preloading said biasing spring whereby the forces exerted by said resilient means and said spring due to the preloading thereof are substantially balanced when the first named pressure responsive member and said second pressure responsive member are subjected to substantially the same predetermined pressure.

13. The combination with a self-lapping valve mechanism of the type including an outlet chamber, a valve for controlling the supply of fluid pressure to said outlet chamber, an element for operating the valve, an operator-controlled member, and means for controlling the operation of said element to operate the valve to establish and maintain a selected pressure in said outlet chamber substantially proportional to the degree of movement of said operator-controlled member including a preloaded resilient connection between the operator-controlled member and element for moving the latter in one direction to open the valve and a member rsponsive to the pressure in the outlet chamber for moving the element in the opposite direction to permit closing of the valve, of means for preventing movement of said element in said opposite direction to permit closing of the valve until the pressure in the outlet chamber substantially equals said selected pressure, said last named means including means for conducting fluid from said outlet chamber to said pressure responsive member, a control valve for controlling the flow of fluid through said conducting means, a second pressure responsive member for moving said control valve to open position, a spring for biasing said control valve toward closed position, a connection between said operator-controlled means and biasing spring for stressing the latter substantially in proportion to the degree of movement of the operator-controlled member, whereby the last named pressure responsive member is ineffective to move the control valve to open position until the pressure in the outlet chamber substantially equals said selected pressure, and means for preloading said spring whereby the ratio of the forces exerted by said resilient means and said spring respectively due to preloading thereof is substantially the same as the ratio of the areas of said first and second named pressure responsive members.

14. Self-lapping fluid pressure control valve mechanism including a casing having inlet and outlet chambers, an inlet valve for controlling the flow of fluid pressure between said chambers, an exhaust port, an exhaust valve for controlling the flow of fluid between said outlet chamber and exhaust port, an element for operating said valves, and means for controlling the operation of said element including operator-controlled means having a resilient connection with the element, a control chamber formed in the casing having a pressure responsive member movably mounted therein and operatively connected with said element, a passage connecting said outlet chamber and control chamber, valve means controlled by the pressure in said outlet chamber and by the operator-controlled means for controlling the flow of fluid through said passage, and a restricted portion in said passage for limiting the rate of flow of fluid therethrough to limit the rate of pressure change in said control chamber.

15. Self-lapping fluid pressure control valve mechanism including a casing having inlet and outlet chambers, an inlet valve for controlling the flow of fluid pressure between said chambers, an exhaust port, an exhaust valve for controlling the flow of fluid between said outlet chamber and exhaust port, an element for operating said valves, and means for controlling the operation of said element including operator-controlled means having a resilient connection with the element, a control chamber formed in the casing having a pressure responsive member movably mounted therein and connected with the element, a pair of fluid passages for connecting the outlet chamber with the control chamber, a check valve associated with one of said passages for permitting the flow of fluid therethrough in one direction and for preventing the flow of fluid therethrough in the other direction, a control valve for controlling the flow of fluid through the other of said passages, means for controlling the operation of said control valve including a member responsive to the pressure in the outlet chamber and a resilient operating connection between said control valve and operator-controlled means, and means for limiting the rate of pressure variation in said control chamber including a restricted portion in at least one of said passages for limiting the rate of flow of fluid therethrough.

WILFRED A. EATON.

REFERENCES CITED

The following references are of record in the file of this patent:

UNITED STATES PATENTS

| Number | Name | Date |
|---|---|---|
| 2,137,954 | Sanford et al. | Nov. 22, 1938 |